US007715462B2

(12) United States Patent
Chin et al.

(10) Patent No.: US 7,715,462 B2
(45) Date of Patent: May 11, 2010

(54) VARIABLE SPREADING FACTOR-ORTHOGONAL FREQUENCY AND CODE DIVISION MULTIPLEXING (VSF-OFCDM) SYSTEM, A RECEIVER FOR USE THEREIN AND A METHOD OF PROCESSING RECEIVED SIGNALS IN SUCH A SYSTEM

(75) Inventors: Francois Po Shin Chin, Singapore (SG); Zhongding Lei, Singapore (SG); Xiaoming Peng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 792 days.

(21) Appl. No.: 10/584,890

(22) PCT Filed: Dec. 31, 2003

(86) PCT No.: PCT/SG03/00298

§ 371 (c)(1),
(2), (4) Date: Jun. 29, 2006

(87) PCT Pub. No.: WO2005/062732

PCT Pub. Date: Jul. 14, 2005

(65) Prior Publication Data

US 2007/0165700 A1 Jul. 19, 2007

(51) Int. Cl.
*H04B 1/00* (2006.01)
*H04L 27/28* (2006.01)
(52) U.S. Cl. ...................... 375/147; 375/260
(58) Field of Classification Search ......... 375/140–142, 375/147, 148, 260, 267
See application file for complete search history.

(56) References Cited

U.S. PATENT DOCUMENTS 6,980,539 B2   12/2005   Hanada et al.

(Continued)

FOREIGN PATENT DOCUMENTS

EP            1 130 840 A2    9/2001

(Continued)

OTHER PUBLICATIONS

Atarshi, H. et al., 'Variable Spreading Factor Orthogonal Frequency and Code Division Multiplexing (VSF-OFCDM),' 2001 Third International Workshop on Multi-Carrier Spread-Spectrum & Related Topics, Sep. 2001, 10 pages.

(Continued)

*Primary Examiner*—David B Lugo
(74) *Attorney, Agent, or Firm*—Baker & Daniels LLP

(57) ABSTRACT

A variable spreading factor-orthogonal frequency and code division multiplexing (VSF-OFCDM) system and receiver for use therein has a sequence extension remover for removing a predetermined number of chips from the received signal to form a modified signal, and a first converter for converting the modified signal from a serial sequence to a parallel sequence. A despreader is coupled to the first converter for despreading the parallel sequence to derive a group of symbols. An orthogonal transform block, such as a Fast Fourier Transform block is coupled to the despreader to transform the symbols from the time domain to the frequency domain. An equalizer block is coupled to the transform block for equalizing the transformed signal to reduce channel distortion. A deinterleaver block is coupled to the equalizer block to form a deinterleaved signal. The deinterleaved signal is then converted from a parallel sequence to a serial sequence.

12 Claims, 1 Drawing Sheet

A Pre-despreading receiver for VSF-OFCDM systems with time domain spreading

U.S. PATENT DOCUMENTS

| | | | |
|---|---|---|---|
| 7,391,715 B2 * | 6/2008 | Lee et al. | 370/208 |
| 2001/0021182 A1 | 9/2001 | Wakutsu | |
| 2003/0137957 A1 | 7/2003 | Kakura et al. | |
| 2004/0071118 A1 * | 4/2004 | Dabak et al. | 370/335 |

FOREIGN PATENT DOCUMENTS

| | | |
|---|---|---|
| EP | 1 317 087 A1 | 6/2003 |
| JP | 2000-78103 A | 3/2000 |
| JP | 2001-320346 A | 11/2001 |
| JP | 2002-204217 A | 7/2002 |
| JP | 2003-348051 A | 12/2003 |
| WO | WO 03/034645 A1 | 3/2003 |

OTHER PUBLICATIONS

Alasti, H. et al., 'A Discrete Multi Carrier Multiple Access Technique for Wireless Communications,' IEEE Vehicular Technology Conference, 48th Conference. VTC 98, May 1998, vol. 2, pp. 1533-1537.

Maeda, N. et al., 'Variable Spreading Factor-OFCDM with Two Dimensional Spreading that Prioritizes Time Domain Spreading for Forward Link Broadband Wireless Access,' IEEE Vehicular Technology Conference, 57th Semiannual Conference, VTC 2003-Spring, Apr. 2003, vol. 1, pp. 127-132.

Official Action with partial English translation issued in corresponding Japanese patent application No. 2005-512832 dated Jun. 9, 2009.

* cited by examiner

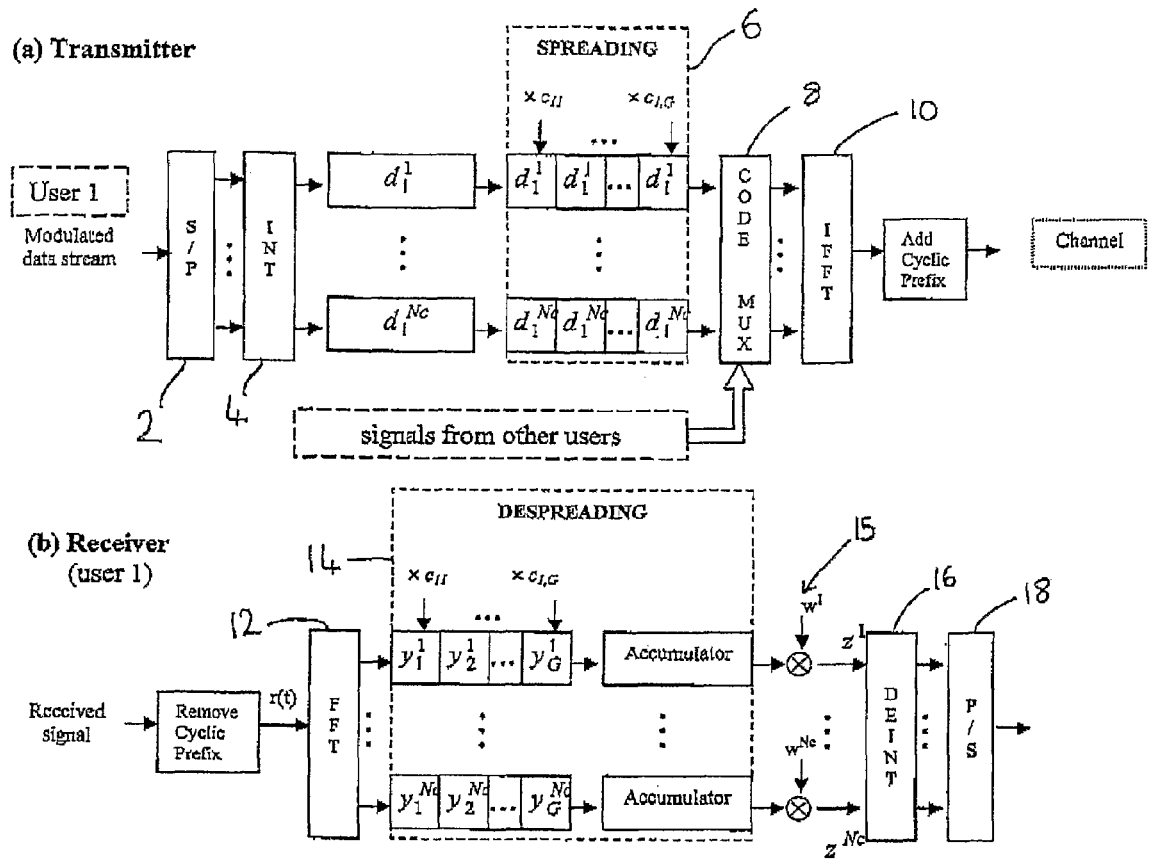
Fig. 1 Prior Art: VSF-OFCDM systems with time domain spreading
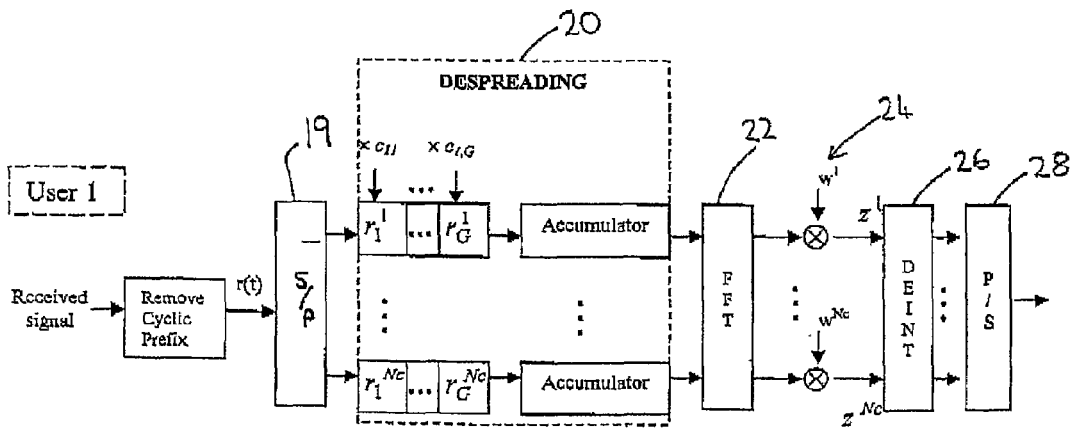
Fig. 2 A Pre-despreading receiver for VSF-OFCDM systems with time domain spreading

VARIABLE SPREADING FACTOR-ORTHOGONAL FREQUENCY AND CODE DIVISION MULTIPLEXING (VSF-OFCDM) SYSTEM, A RECEIVER FOR USE THEREIN AND A METHOD OF PROCESSING RECEIVED SIGNALS IN SUCH A SYSTEM

CROSS-REFERENCE TO RELATED APPLICATIONS

This application is a nationalization of PCT Patent application Ser. No. PCT/SG2003/000298, filed Dec. 31, 2003, the disclosure of which is expressly incorporated herein by reference.

FIELD OF THE INVENTION

The present invention relates to a variable spreading factor-orthogonal frequency and code division multiplexing (VSF-OFCDM) system, a receiver for use therein and a method of processing received signals in such a system.

BACKGROUND OF THE INVENTION

Broadband wireless access along with evolving mobile Internet and multimedia services are driving a surge of research and development activities for future wireless communication systems. The Variable Spreading Factor-Orthogonal Frequency and Code Division Multiplexing (VSF-OFCDM) system has been proposed as the most promising downlink wireless access scheme for broadband packet wireless transmission (see H. Atarashi and M. Sawahashi, "Variable spreading factor orthogonal frequency and code division multiplexing (VSF-OFCDM)", 2001 Third International Workshop on Multi-Carrier Spread Spectrum (MC-SS 2001) & Related Topics, September 2001).

VSF-OFCDM, a variant of the multi-carrier Code Division Multiple Access (CDMA) system, is designed to achieve a very high transmission data rate even in the challenging radio propagation environment with multi-path fading, taking advantage of both multi-carrier and CDMA systems.

In VSF-OFCDM systems, multi-carrier signals can be spread in either the time domain or the frequency domain. It is shown in H. Atarashi, N. Maeda, Y. Kishiyama, and M. Sawahashi, "Performance of VSF-OFCDM with Two-dimensional Spreading Prioritizing Time Domain Spreading," Technical Report of IEICE, RCS2002-85, June 2002 (in Japanese) that time domain spreading is better than frequency domain spreading in terms of maintaining orthogonality between spread signals. This property makes time domain spreading systems have less inter-code interference, which is crucial in the adaptive modulation and channel coding scheme employed in VSF-OFCDM systems.

VSF-OFCDM systems are designated for downlink transmission where the power consumption, size, weight and cost of mobile receivers are paramount. Conventional VSF-OFCDM receivers work most of the time in the frequency domain and the received time domain signals received from a transmitter have to be transformed to the frequency domain for processing. Although fast algorithms like Fast Fourier Transforms (FFT) are available for the transformation, it is still one of major sources for computational loads, or power consumption in conventional time domain spreading VSF-OFCDM systems where FFT is performed at the chip rate. Therefore, there is a need to simplify the receiver for use in time domain spreading VSF-OFCDM systems.

SUMMARY OF THE INVENTION

In general terms, the present invention proposes a receiver structure for a VSF-OFCDM system with spreading in a first domain, such as the time domain, in which the received signals are despread in this first domain, before being transformed into a second domain, such as the frequency domain by, for example, the application of a Fast Fourier Transform (FFT). Therefore, the frequency of FFT operation is reduced by a factor of the processing gain of the spreading and is at the symbol rate. The simplified receiver structure embodying the invention aims to reduce the system computational load and/or power consumption.

According to a first aspect of the present invention there is provided a receiver for use in a variable spreading factor-orthogonal frequency and code division multiplexing (VSF-OFCDM) system, said receiver being arranged to process a received signal having an associated chip rate, said receiver comprising:

a sequence extension remover for removing a predetermined number of chips from at least one predetermined position of said received signal to form a modified signal;

a first converter for converting the modified signal from a serial sequence to a parallel sequence;

a despreader coupled to said first converter for receiving said parallel sequence and for despreading said parallel sequence to derive a group of symbols;

an orthogonal transform block, coupled to said despreader for transforming said symbols from a first domain to form a transformed signal in a second domain;

an equalizer block coupled to said transform block for equalizing said transformed signal to reduce channel distortion and form an equalized signal;

a deinterleaver block coupled to said equalizer block to receive said equalized signal and form a deinterleaved signal; and a second converter coupled to said deinterleaver block for converting said deinterleaved signal from a parallel sequence to a serial sequence.

According to a second aspect of the present invention there is provided a variable spreading factor-orthogonal frequency and code division multiplexing (VSF-OFCDM) system comprising one or more of the above-defined receivers.

According to a third aspect of the present invention there is provided a method of processing a received signal having an associated chip rate in a variable spreading factor-orthogonal frequency and code division multiplexing (VSF-OFCDM) system comprising the steps of:

removing a predetermined number of chips from at least one predetermined position of said received signal to form a modified signal;

converting the modified signal from a serial sequence to a parallel sequence;

despreading said parallel sequence to derive a group of symbols;

transforming in an orthogonal transform block said symbols from a first domain to form a transformed signal in a second domain;

equalizing said transformed signal to reduce channel distortion and form an equalized signal;

deinterleaving said equalized signal to form a deinterleaved signal; and converting said deinterleaved signal from a parallel sequence to a serial sequence.

BRIEF DESCRIPTION OF THE DRAWINGS

Preferred features of the invention will now be described, for the sake of illustration only, with reference to the following Figures in which:

FIG. 1a is a schematic block diagram of a transmitter in a conventional downlink VSF-OFCDM system with time domain spreading;

FIG. 1b is a schematic block diagram of a receiver in a conventional downlink VSF-OFCDM system with time domain spreading; and FIG. 2 is a schematic diagram of a receiver for use in a VSF-OFCDM system with time domain spreading according to an embodiment of the invention.

DETAILED DESCRIPTION OF PREFERRED EMBODIMENTS

A conventional downlink VSF-OFCDM system with time domain spreading is illustrated in FIGS. 1a and 1b. In the illustrated system, it is assumed that there are K active users transmitting simultaneously and synchronously. Orthogonal spreading codes, such as Walsh Hadamard codes, which have a spreading factor G are used to ensure orthogonality between users.

FIG. 1a shows a conventional transmitter for use in downlink VSF-OFCDM systems with time domain spreading. For each user k (where k=1,2, ... ,K), the modulated data sequence is first converted into Nc parallel sequences in a series-to-parallel converter 2. Nc is assumed to be equal to the number of multi-carriers of the VSF-OFCDM system, for simplicity. The Nc parallel sequences are then passed to an interleaver 4. Without loss of generality, a block of Nc symbols for each user k is considered and denoted as $d_k^n$ after interleaving, where n stands for the nth symbol and corresponds to the nth subcarrier (n=1,2, ... ,Nc). Each of the data symbols, $d_n^k$, is then spread in the time domain in a spreader block 6 with G chips per symbol. The spread chip rate data are then mixed with that from other users at the code MUX block 8 before being transformed into the time domain by the application of an Inverse Fast Fourier Transform (IFFT) in an IFFT block 10. The resulting serial output signal is then added with a guard interval or cyclic prefix and is transmitted on the wireless channel.

FIG. 1b shows a conventional receiver for use in downlink VSF-OFCDM systems with time domain. spreading. At the receiver, the serial signal received from a transmitter, for example a transmitter of the type illustrated in FIG. 1a, is processed to remove the cyclic prefix. The received serial signal is then transformed back to the frequency domain by application of a Fast Fourier Transform (FFT) in a FFT block 12 and into a parallel signal. The transformed signal is despread in a despreader block 14 corresponding to the particular user, equalized in an equalizer 15 and then deinterleaved in a deinterleaving block 16. The deinterleaved signal is then converted back from a parallel to a serial sequence in a parallel-to-series converter 18.

FIG. 2 shows a receiver for VSF-OFCDM systems according to an embodiment of the invention. Such a receiver may be used, for example, in conjunction with the transmitter of FIG. 1a and the receiver of FIG. 2 receives the serial signal output therefrom.

At the receiver of the desired user, the G×Nc components (chips) of the received serial signal in the time domain are processed to remove the cyclic prefix. The processed signal is then converted in a series-to-parallel converter 19 from a serial sequence to an array of parallel sequences, each sequence corresponding to one of the multicarriers in the system.

The chips in each sequence are then grouped together and despread in a despreader 20 corresponding to the particular user and the despread signal is transformed to a frequency domain signal by the application of a Fast Fourier Transform (FFT) in a FFT block 22. The transformed signal is then equalized in an equalizer 24 and deinterleaved in a deinterleaver 26. The deinterleaved signal is then converted back from a parallel to a serial sequence in a parallel-to-series converter 28.

In the transmitter illustrated in FIG. 1a, the transmitted signal during one VSF-OFCDM block symbol in the frequency domain (before IFFT) may be written in a matrix form as $$S = \sum_{k=1}^{K} D_k \cdot C_k \qquad (1)$$

where $S = [s_1, s_2, \ldots, s_G], \in C^{Nc \times G}$ $s_g = [s_g^1, s_g^2, \ldots, s_g^{Nc}]^T, (g=1, \ldots, G), \in C^{Nc}$ $C_k = \mathrm{diag}(c_{k1}, c_{k2}, \ldots, c_{kG}), \in C^{G \times G}$ $D_k = d_k \cdot e, \in C^{Nc \times G}$ $d_k = [d_k^1, d_k^2, \ldots, d_k^{Nc}]^T, \in C^{Nc}$ $c_{kg}$ is the gth element (g=1, ... ,G) of user k's spreading code, e is a G-length row vector with all one elements, and 'T' stands for transposition.

It is assumed that the channel impulse response has a finite maximum delay spread less than the length of the cyclic prefix.

In the conventional receiver illustrated in FIG. 1b, as mentioned above, the received signal, after removing the cyclic prefix, is transformed back to the frequency domain by application of a Fast Fourier Transform (FFT). The received signal (assuming user 1 is the desired user) in the frequency domain may be written as:

$$Y = H \circ S + V_f \in C^{Nc \times G} \qquad (2)$$

where H is the Nc-by-G matrix with (n,g)th entry (n=1, ... ,Nc and g=1, ... ,G) corresponding to the channel response in the frequency domain at the nth subcarrier and gth chip, $V_f$ is the additive white Gaussian noise (AWGN) corrupted in the frequency domain, and '∘' stands for Hadamard product or dot product.

After despreading and equalization, the statistic before deinterleaving is:

$$z = (Y \cdot c_1) \circ w \in C^{Nc} \qquad (3)$$

where $z = [z^1, z^2, \ldots, z^{Nc}]^T, \in C^{Nc}$ $c_1 = [c_{11}, c_{12}, \ldots c_{1G}]^T, \in C^G$ $w = [w^1, w^2, \ldots, w^{Nc}]^T, \in C^{Nc}$ In the receiver embodying the present invention illustrated in FIG. 2, the G×Nc components (chips) of the received signal block in the time domain after removing the cyclic prefix may be denoted as $r_1^1, r_2^1 \ldots r_G^1, \ldots, r_1^{Nc}, r_2^{Nc} C \ldots r_G^{Nc}$, where the superscription and subscription stands for corresponding frequency bin and chips per frequency bin respectively.

As mentioned above, in the receiver of FIG. 2, unlike conventional VSF-OFCDM receivers of the type illustrated, for example in FIG. 1b, the chips are not fed to the FFT block directly, but are instead grouped firstly according to a different frequency bin after application of a Fast Fourier Transform (FFT). For example, the signal components (chips) corresponding to the first subcarrier after FFT, $r_1^1, r_2^1, \ldots, r_G^1$ are grouped together. The time domain signal after grouping may be written in matrix form as:

$$R = F^H \cdot (H \circ S) + V_t \in C^{Nc \times G} \qquad (4)$$

where R is the Nc-by-G matrix with $r_g^n$ as the (n,g)th entry (n=1, ..., Nc and g=1, ..., G), $V_t$ is the time domain AWGN noise matrix, and F is defined as Discrete Fourier Transform (DFT) matrix with $W_{Nc}^{-nm} = 1/\sqrt{Nc} \cdot \exp(-j2\pi nm/Nc)$ as its nth row mth column element, consequently, the Inverse DFT (IDFT) matrix is $F^H$ where 'H' stands for Hermitian transposition.

Each of the chips is despread first by multiplying the user's spreading code (chip by chip) of the desired user and accumulating the results. Then, as mentioned above, the despread signal is fed to the FFT block 22 for transformation. The signal after despreading can be expressed as an Nc-length vector, i.e.

$$x = R \cdot c_1 \in C^{Nc} \qquad (5)$$

It should be noted that the size of the despread signal sequence is now reduced by a factor of the processing gain, G, this being the ratio of the chip rate to the symbol rate. Therefore, the Fast Fourier Transform (FFT) block 22 works at the symbol rate, which is in contrast to conventional receivers, for example that shown in FIG. 1b, which work at the chip rate.

One of the main factors in the computational load and/or power consumption of receiver circuits comes from the Fast Fourier Transform (FFT) block 12, 22. The receiver embodying the invention illustrated in FIG. 2 has a decreased working rate of the Fast Fourier Transform (FFT) block 22, and can thus reduce computational load and/or save power consumption by a factor of the processing gain of the time domain spreading VSF-OFCDM system, compared to conventional receivers of the type illustrated in FIG. 1b.

In the receiver illustrated in FIG. 2, after equalization by multiplying weights for subcarriers in the frequency domain, the resulting statistics vector z before deinterleaving may be written as:

$$z = (F \cdot x) \circ w \in C^{Nc} \qquad (6)$$

It will be seen that the statistics, that is the signals after equalisation but before deinterleaving, of both the receiver according to an embodiment of the invention and the conventional receiver, are equivalent. In fact, substituting x and R from equations (4) and (5) respectively, into formula (6), gives:

$$\begin{aligned} z &= (F \cdot R \cdot c_1) \cdot w \qquad (7) \\ &= \{F \cdot [F^H \cdot (H \cdot S) + V_t] \cdot c_1\} \cdot w \\ &= \{[(H \cdot S) + V_f] \cdot c_1\} \cdot w \end{aligned}$$

where $F \cdot F^H = I$, $F \cdot V_t = V_f$ and I is the identity matrix.

It will therefore be seen that the formula (7) is identical to formula (3) above, with Y substituted by formula (2).

In summary, the invention proposes a simplified receiver structure for use in VSF-OFCDM systems that incorporate time domain spreading. The receiver embodying the invention aims to reduce the computational load and/or power consumption by a factor of the spreading factor of the system, without compromising system performance, as the statistic at the deinterleaver is mathematically equivalent to that of the conventional receiver.

The systems and methods according to the present invention may be particularly useful in the production of devices for use, for example, in a VSF-OFCDM system acting as a downlink broadband packet wireless access scheme for 4G technology.

Various modifications to the embodiments of the present invention described above may be made. For example, other modules and method steps can be added or substituted for those above. Specifically, the invention may be extended straightforwardly to VSF-OFDMA systems with two dimensional spreading, that is, spreading in both the time domain and the frequency domain. In a two dimensional spreading VSF-OFDMA system, a receiver embodying the present invention may firstly despread the signal in the time domain before the application of a Fast Fourier Transform (FFT), as has been described above in connection with a VSF-OFCDM system having time domain spreading only. The frequency domain despreading may be performed after application of a Fast Fourier Transform (FFT), as in a conventional VSF-OFCDM system with two dimensional spreading. Therefore, although the invention has been described above using particular embodiments, many variations are possible within the scope of the claims, as will be clear to the skilled reader, without departing from the spirit and scope of the invention.

The invention claimed is:

1. A receiver for use in a variable spreading factor-orthogonal frequency and code division multiplexing (VSF-OFCDM) system, said receiver being arranged to process a received signal having an associated chip rate, said receiver comprising:
   a sequence extension remover for removing a predetermined number of chips from at least one predetermined position of said received signal to form a modified signal;
   a first converter for converting the modified signal from a serial sequence to a parallel sequence;
   a despreader coupled to said first converter for receiving said parallel sequence and for despreading said parallel sequence to derive a group of symbols;
   an orthogonal transform block, coupled to said despreader for transforming said symbols from a first domain to form a transformed signal in a second domain;
   an equalizer block coupled to said transform block for equalizing said transformed signal to reduce channel distortion and form an equalized signal;
   a deinterleaver block coupled to said equalizer block to receive said equalized signal and form a deinterleaved signal; and
   a second converter coupled to said deinterleaver block for converting said deinterleaved signal from a parallel sequence to a serial sequence.

2. The receiver according to claim 1, wherein said sequence extension remover is arranged to remove a predetermined number of chips carrying data denoting a cyclic prefix.

3. The receiver of claim 1, wherein said orthogonal transform block comprises a Fast Fourier Transform block.

4. The receiver of claim 1, wherein said first domain is the time domain and said second domain is the frequency domain.

5. The receiver of claim 1, wherein said despreader despreads said sequence to a symbol rate, said symbol rate being less than said chip rate at which said received signal was spread prior to being received by said receiver, the ratio of the chip rate to the symbol rate being the processing gain of the receiver.

6. A variable spreading factor-orthogonal frequency and code division multiplexing (VSF-OFCDM) system comprising one or more receivers according to claim 1.

7. A method of processing a received signal having an associated chip rate in a variable spreading factor-orthogonal frequency and code division multiplexing (VSF-OFCDM) system comprising the steps of:
- removing a predetermined number of chips from at least one predetermined position of said received signal to form a modified signal;
- converting the modified signal from a serial sequence to a parallel sequence;
- despreading said parallel sequence to derive a group of symbols;
- transforming in an orthogonal transform block said symbols from a first domain to form a transformed signal in a second domain;
- equalizing said transformed signal to reduce channel distortion and form an equalized signal;
- deinterleaving said equalized signal to form a deinterleaved signal; and
- converting said deinterleaved signal from a parallel sequence to a serial sequence.

8. The method according to claim 7, wherein the step of removing said predetermined number of chips comprises removing chips carrying data denoting a cyclic prefix.

9. The method of claim 7, wherein the step of transforming said signal comprises applying a Fast Fourier Transform to said symbols.

10. The method of claim 7, wherein the step of transforming said symbols comprises transforming said symbols from the time domain to the frequency domain.

11. The method of claim 7, wherein the step of deinterleaving comprises forming a deinterleaved signal.

12. The method of claim 7, wherein the step of despreading comprises despreading said sequence to a symbol rate, said symbol rate being less than said chip rate at which said received signal was spread prior to being received by said receiver, the ratio of the chip rate to the symbol rate being the processing gain of the receiver.

* * * * *